(12) United States Patent
Nguyen

(10) Patent No.: US 10,891,779 B2
(45) Date of Patent: Jan. 12, 2021

(54) EFFICIENT VOLUMETRIC RECONSTRUCTION WITH DEPTH SENSORS

(71) Applicant: Naked Labs Austria GMBH, Vienna (AT)

(72) Inventor: William Nguyen, Redwood City, CA (US)

(73) Assignee: Naked Labs Austria GMBH, Vienna (AT)

( * ) Notice: Subject to any disclaimer, the term of this patent is extended or adjusted under 35 U.S.C. 154(b) by 38 days.

(21) Appl. No.: 16/316,482

(22) PCT Filed: Jul. 13, 2017

(86) PCT No.: PCT/EP2017/067761
§ 371 (c)(1),
(2) Date: Jan. 9, 2019

(87) PCT Pub. No.: WO2018/011370
PCT Pub. Date: Jan. 18, 2018

(65) Prior Publication Data
US 2019/0244414 A1    Aug. 8, 2019

(30) Foreign Application Priority Data

Jul. 13, 2016 (DE) ......................... 10 2016 112 898

(51) Int. Cl.
*G06T 15/08* (2011.01)
*G06T 7/30* (2017.01)
(Continued)

(52) U.S. Cl.
CPC ................ *G06T 15/08* (2013.01); *G06T 7/30* (2017.01); *G06T 7/50* (2017.01); *G06T 7/55* (2017.01);
(Continued)

(58) Field of Classification Search
CPC ..................................................... G06T 15/08
See application file for complete search history.

(56) References Cited

U.S. PATENT DOCUMENTS

2008/0024493 A1* 1/2008 Bordoloi ................. G06T 15/08
345/423
2012/0306876 A1* 12/2012 Shotton ................... G06T 7/251
345/424

(Continued)

OTHER PUBLICATIONS

Shahram Izadi etal., 2011. KinectFusion: real-time 3D reconstruction and interaction using a moving depth camera. In Proceedings of the 24th annual ACM symposium on User interface software and technology (UIST '11). Association for Computing Machinery, New York, NY, USA, 559-568. (Year: 2011).*
International Preliminary Report on Patentability, PCT/EP2017/067761, dated Jan. 15, 2019, 1 pages.

(Continued)

*Primary Examiner* — Phi Hoang
(74) *Attorney, Agent, or Firm* — Dority & Manning, P.A.

(57) ABSTRACT

A method for real-time volumetric 3-D reconstruction of an object uses at least one depth sensor camera. In a preparation step, voxels are collected in a reconstructed scene depending on a new depth map frame, and the collected voxels are cached in order to perform an update of the reconstructed scene. In an integration step, the collected and cached voxels of the preparation step are updated with a newly captured depth map frame. However, the preparation step, and the integration step are separated from each other so that both steps can be carried out in parallel, and at the same time.

12 Claims, 3 Drawing Sheets

(51) Int. Cl.
*G06T 7/55* (2017.01)
*G06T 7/50* (2017.01)
(52) U.S. Cl.
CPC  *G06T 2200/04* (2013.01); *G06T 2207/10028* (2013.01)

(56) References Cited

U.S. PATENT DOCUMENTS

| | | | | |
|---|---|---|---|---|
| 2014/0176574 | A1* | 6/2014 | Bakalash | G06F 9/5061 345/505 |
| 2015/0049169 | A1* | 2/2015 | Krig | H04N 13/211 348/46 |
| 2018/0164156 | A1* | 6/2018 | Price | G01J 3/0264 |
| 2018/0253909 | A1* | 9/2018 | Chen | G06T 7/337 |

OTHER PUBLICATIONS

Written Opinion of the International Searching Authority, PCT/EP2017/067761, 8 pages.
International Search Report, PCT/EP2017/067761, dated Oct. 10, 2017, 16 pages.
Kahler, Olaf et al., "Very High Frame Rate Volumetric Integration of Depth Images on Mobile Devices", IEEE Transactions on Visualization and Computer Graphics, vol. 21, No. 11, Nov. 15, 2015, pp. 1241-1250.
Klingensmith, Matthew et al., "Chisel: Real Time Large Scale 3D Reconstruction Onboard a Mobile Device Using Spatially Hashed Signed Distance Fields," Robotics: Science and Systems XI, Jul. 3, 2015, 9 pages.
Niessner, Matthias et al., "Real-Time 3D Reconstruction at Scale Using Voxel Hashing" ACM Transactions on Graphics, vol. 32, No. 6, ISSN: 0730-0301, Nov. 1, 2013, pp. 1-11.

* cited by examiner

EFFICIENT VOLUMETRIC RECONSTRUCTION WITH DEPTH SENSORS

CROSS-REFERENCE TO RELATED APPLICATIONS

The present application is related by subject matter to the following concurrently filed PCT applications (all of which designate the US):

a. International Application No.: PCT/EP2017/067668; entitled "Determination of Body Fat Content by Body-Volume-Distribution and Body-Impedance-Measurement".

b. International Application No.: PCT/EP2017/067669; entitled "Optical Marker to Adjust the Turntable of a 3D Body Scanner".

c. International Application No.: PCT/EP2017/067761; entitled "Efficient Volumetric Reconstruction with Depth Sensors," which claims priority to German Application No.: DE 10 2016 112 898.8.

d. International Application No.: PCT/2017/067672; entitled "Skeleton Estimation from Body Mesh".

e. International Application No.: PCT/2017/067667; entitled "Method for Creating a 3D-Model and 3D-Body-Scanner".

f. International Application No.: PCT/2017/067664; entitled "Smart Body Analyzer with 3D Body Scanner and Vital Parameter Sensors".

g. International Application No.: PCT/EP2017/067665; entitled "Motor Driven Turntable with Foldable Sensor Mast," which claims priority to German Application No.: DE 10 2016 112 893.7.

h. International Application No.: PCT/EP2017/067671; entitled "Alignment of Scan Parts on a Turntable," which claims priority to German Application No.: DE 10 2016 112 890.2.

The above cited PCT international applications are hereby incorporated herein in their entireties by this reference for all purposes. Any combination of the features and aspects of the subject matter described in at least one of the incorporated applications may be combined with embodiments of the present application to yield still further embodiments of the present invention.

FIELD OF THE INVENTION

The invention relates to a method for real-time volumetric 3D reconstruction of an object using at least one depth sensor camera. Further, the invention relates to a 3D body scanner for real-time volumetric 3D reconstruction of an object.

BACKGROUND OF THE INVENTION 3D reconstruction or 3D scanning technologies have recently become pretty popular in wide fields of applications: Virtual clothes try-on for e-commerce, Fitness tracking, Medical application and/or Game industry.

Capturing a 3D surface of objects from depth sensors has been actively studied in various fields including robotics, augmented reality, and autonomous driving. Not long ago, several 3D reconstruction approaches have been proposed utilizing powerful GPU computation. Recently, CPU based 3D reconstruction methods have been widely explored and favored because of their much lower cost compared to GPU. In the following, we will discuss both GPU based approaches and CPU based approaches of the related work.

GPU based volumetric approaches:

Kinect Fusion (http://homes.cs.washington.edu/~newcombe/papers/newcombe_etal_ismar2011.pdf) is the most cited work as real-time GPU based 3D volumetric reconstruction approach. However, open-source implementations are only available via other parties: KinFu from Point Cloud Library (http://pointclouds.org) and KFusion (https://github.com/GerhardR/kfusion). The Kinect Fusion approach utilizes the massive parallelism capacity of modem GPUs in order to reconstruct a high quality 3D surface of the environment in real-time. However, this approach requires a huge memory capacity. Moreover, the approach is limited to a predefined working 3D volume and resolution which the reconstruction can operate in; hence it is not scalable. For instance, the approach can only perform well with a resolution of millimeter voxels in a limited 2 cubic meter volume given a modem GPU. Even though GPU based approaches achieve considerably good results for certain use cases, the cost of modem GPUs is not favorable to many applications.

CPU based volumetric approaches:

CPU based 3D volumetric reconstruction using depth sensors has been actively studied in order to drive down the cost of 3D scanning systems. This enables 3D scanning technologies to reach a wider range of applications. One recently proposed CPU based approach is by Frank SteinbrUcker et. al (https://github.com/tum-vision/fastfusion). This volumetric reconstruction employs octree data structure in order to focus reconstruction computation on voxels which are close to the objects' surfaces. However, such data structure makes it hard to generate a mesh of the volumetric scene; also, it is hard to do ray-casting for rendering depth maps of the reconstructed scene. To tackle difficulties in generating the surface mesh and ray-casting, Olaf Kahler introduced InfiniTam which uses an alternative hashing data structure (http://www.robots.ox.ac.uk/~victor/infinitam/). The smart hashing method by InfiniTam enables the reduction of memory usage but it is difficult to integrate new depth maps. Although the authors exploit visibility checking in order to boost ray-casting speed performance, it is still pretty slow. For instance, ray-casting performs at around 1 fps on a core-i7 3 GHz CPU. Therefore, the authors only use ray-casting on a small number of selective frames for camera poses estimation. This limits accuracy performance due to the sensitivity of iterative closest point (ICP) methods with respect to visibility of depth pixels.

Recent development in 3D scanning technologies has advanced in overall performance. However, there is still a strong trade-off between accuracy performance and speed performance. Therefore, it remains highly challenging to achieve both high accuracy and high speed performance.

BRIEF OBJECTS AND SUMMARY OF THE INVENTION

The object of the present invention is to provide a method for real-time, efficient volumetric 3D reconstruction of an object using at least one depth sensor camera and a 3D body scanner, which eliminates the disadvantages of the prior art.

The aforementioned object is achieved by means of a method for real-time volumetric 3D reconstruction of an object using at least one depth sensor camera and of a 3D body scanner exhibiting the features described below.

Proposed is a method for real-time volumetric 3D reconstruction of an object using at least one depth sensor camera, comprising: a preparation step, in which voxels are collected in a reconstructed scene depending on a new depth map frame and in which the collected voxels are cached in order to do an update of the reconstructed scene; and an integration step, in which the collected and cached voxels of the preparation step are updated with a newly captured depth map frame (403); wherein the preparation step and the integration step are separated from each other so that both steps can be carried out in parallel in the volumetric 3D reconstruction process.

It is advantageous if the preparation step starts when a new depth map frame is localized to a 3D coordinate system of the re-constructed scene.

It is advantageous if in the preparation step at least one first cast ray is generated, which extends from a camera center through an associated 3D position of a pixel on a camera plane.

In an advantageous further aspect, a first depth interval is determined on the first cast ray in the preparation step, in particular depending on the new depth map frame and/or depending on a depth value of the associated pixel.

It is advantageous if in a search step of the preparation step an existing voxel and a, in particular adjacent, non-existing voxel, which are hit by the first cast ray, are searched in the first depth interval.

In an advantageous further aspect, the existing voxel and the non-existing voxel are searched on each pixel in the preparation step, in particular by checking the respective first depth interval along the first cast ray.

It is advantageous if in the preparation step multiple search steps are parallelized such that each thread does searching on one pixel.

It is advantageous if as a result of the preparation step a list of existing voxels and non-existing voxels, which are close to the observed depth map, is prepared.

In an advantageous further aspect of the integration step, the update starts by re-projecting a voxel origin position of a reconstructed voxel of the reconstructed scene to the camera plane.

It is advantageous if a second cast ray is generated for re-projecting the voxel origin position of the reconstructed voxel to the camera plane, which extends from the camera center through the associated voxel origin position of the reconstructed voxel.

It is advantageous if a re-projected location of the voxel origin on the camera plane is determined, which leads to an associated depth value of an associated pixel of the depth map frame.

It is advantageous if the determined depth value is used to update a Signed Distance Function of the corresponding voxel.

It is advantageous if the integration step is parallelized such that each thread updates separate reconstructed voxels of the reconstructed scene.

It is advantageous if a indexing mechanism is used in which a mapping array is predefined, which maps the 3D voxel origin position of at least one reconstructed voxel of the scene to a pre-allocated array of voxel blocks.

It is advantageous if a number of reconstructed surface voxels is predicted, in particular on the base of experience values being experimental derived. Further, it is advantageous if the array of reconstructed voxel blocks is pre-allocated with this number.

It is advantageous if for parallelizing the preparation and integration step the non-existing voxels are successively updated to the array of the re-constructed voxel blocks.

It is advantageous if the integration step concurrently processes the list of existing and non-existing voxels.

It is advantageous if the method comprises a ray-casting step, in which the depth map input is exploited.

It is advantageous if in the ray-casting step a second depth interval is determined on a third cast ray by using an initial observed depth map frame where the depth value of the associated pixel (502) is known.

It is advantageous if in the ray-casting step voxels are searched along the second depth interval, which are hit by the third cast ray.

It is advantageous if in the ray-casting step a surface point along the third cast ray is interpolated using a Signed Distance Function value of the founded and/or neighboring voxels.

Proposed is a 3D body scanner for real-time volumetric 3D reconstruction of an object comprising: at least one depth sensor and a processor, which is designed to operate with a method according to the previous specification.

BRIEF DESCRIPTION OF THE DRAWINGS

Additional advantages of the invention are described in the following exemplary embodiments. The drawings show in.

DETAILED DESCRIPTION OF EXEMPLARY EMBODIMENTS OF THE INVENTION

This invention proposes an efficient volumetric 3D reconstruction using very low memory usage. The present invention nonetheless can perform high quality 3D reconstruction using depth sensors in real-time (e.g., 25 fps) on a reasonably low cost computation unit equipped with low memory capacity.

Figure 1:
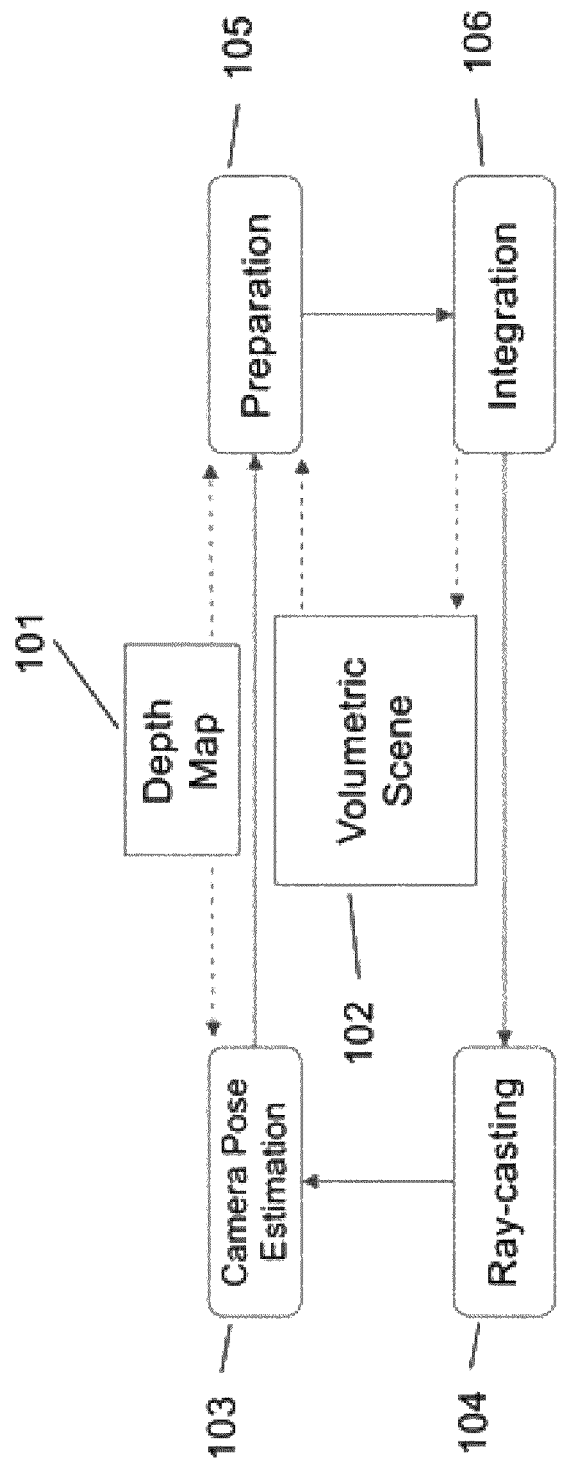
FIG. 1 overview of the 3D reconstruction pipeline.

The invented 3D reconstruction system comprises 3 key components: camera poses estimation, preparation, and integration (see FIG. 1). Such system is widely is widely referred to as a Simultaneous Localization And Mapping (SLAM) system. Our invention focuses on the components: ray-casting, preparation, and integration.

We organize the description of the invention into four sub-sections highlighting our efficient indexing approach, smart caching approach, parallelization algorithm for volumetric reconstruction, and efficient ray-casting method.

Figure 2:
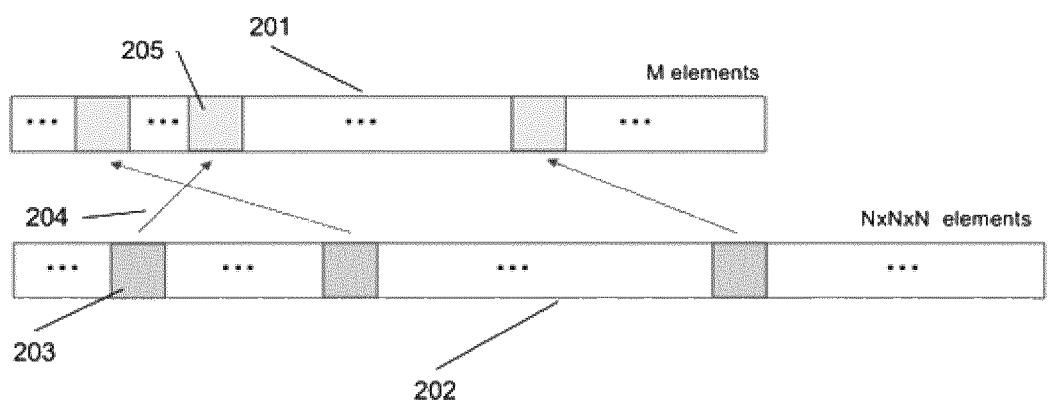
FIG. 2 indexing mechanism used in the reconstruction.

Fast preparation with efficient indexing:

We predefine a mapping array 202 in FIG. 2, which maps a 3D voxel origin position to a pre-allocated array of voxel blocks 201. For example, we want to reconstruct a 2 cubic meter environment with 1 mm resolution voxels; this leads array 202 to have 2000×2000×2000 elements. Note that the elements of this array are integers, so there is not much memory space required to store such an array.

From experiments, we can well predict the number of reconstructed surface voxels for each use case. Given such number, we can pre-allocate the array of reconstructed voxel blocks 201. Each voxel block consists of 8×8×8 voxels.

This indexing mechanism is extremely efficient for creating, accessing and modifying the voxels; this indexing mechanism enables a fast preparation step before integrating the newly observed depth map into the reconstructed scene.

Figure 3:
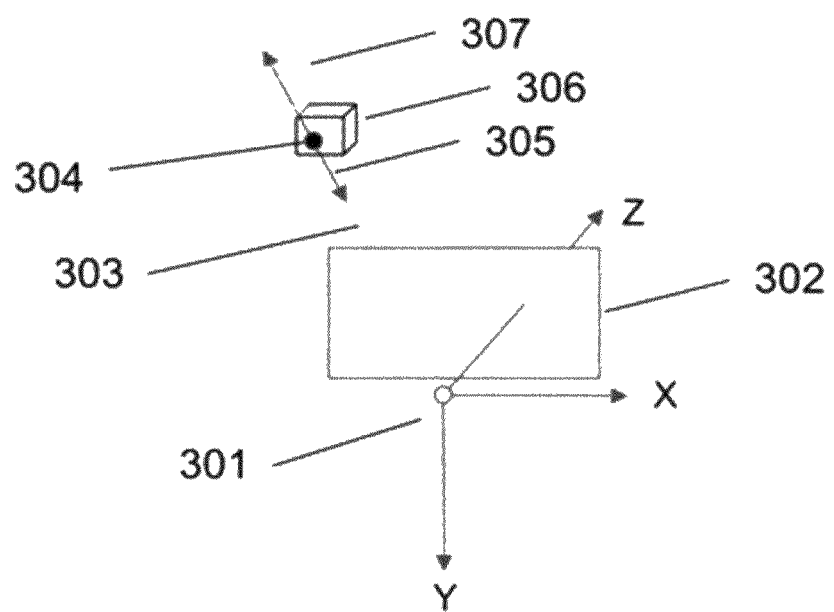
FIG. 3 preparation step caches related visible voxels in current frame. This allows to efficiently update given newly observed depth map in the "Integration" step.

The preparation step starts when a new depth map frame is localized to the 3D coordinates of the reconstructed scene (see FIG. 1). Given the registered depth map frame, we can search on each pixel for corresponding voxels (existing or not) by checking in the first depth interval 305 (FIG. 3) along the first cast ray 303.

Such ray 303 results in 2 found voxels: an existing one as 306, and a non-existing one as 307. This search step can be easily parallelized such that each thread does searching on one pixel ray.

The preparation step will result in a list of existing voxels and non-existing voxels which are close to the observed depth map. This prepared list makes it efficient for later integration of the depth map to the reconstructed scene.

Figure 4:
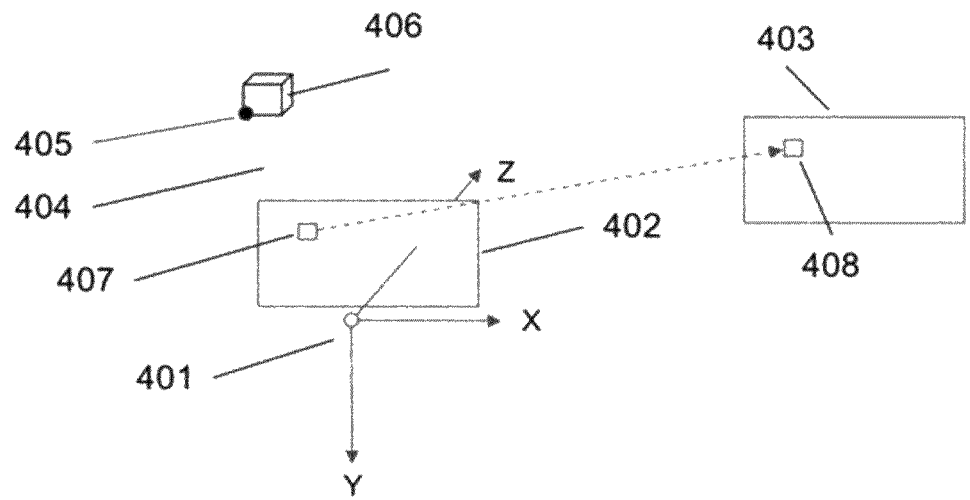
FIG. 4 integration step updates cached voxels with newly captured depth map in the current frame.

Fast integration through efficient caching:

Preparation, 105 in FIG. 1, collects a list of existing voxels and non-existing voxels. These voxels are then updated given a newly observed depth map frame, 101 in FIG. 1. The depth map frame 101 is also illustrated as 403 in FIG. 4. The update starts by re-projecting the voxel origin position 405 to the camera plane 402 in FIG. 4. A second cast ray 404 is generated for re-projecting the voxel origin position 405 of the reconstructed voxel 406 to the camera plane 402. The second cast ray 404 extends from the camera center through the associated voxel origin position 405 of the reconstructed voxel 406. The re-projected location 407 leads to an associated depth value of the associated pixel 408 of the depth map frame 403.

We then can use the depth value in order to update the Signed Distance Function of the corresponding voxel. Through efficient caching from the preparation step, this integration step can be easily parallelized such that each thread can update separate voxels.

Parallelizing volumetric preparation and integration:

Through separation of the preparation step and the integration step, we are able to parallelize the major computation of the reconstruction process. As shown in the preparation step, parallelization of searching for existing and non-existing voxels is easily applied through dedicating each thread to a search along the cast ray of one pixel.

The non-existing voxels then need to be successively updated to the array of reconstructed voxel blocks 201 in FIG. 2.

Then, the integration step can concurrently process the list of existing and non-existing voxels.

Efficient ray-casting exploiting depth map input:

Normally, ray-casting is used to generate a reconstructed depth map frame for a specific camera pose. The rendered depth map is then used for visualization of relative frames alignment, between the rendered depth map frame and the input observed depth map frame.

Figure 5:
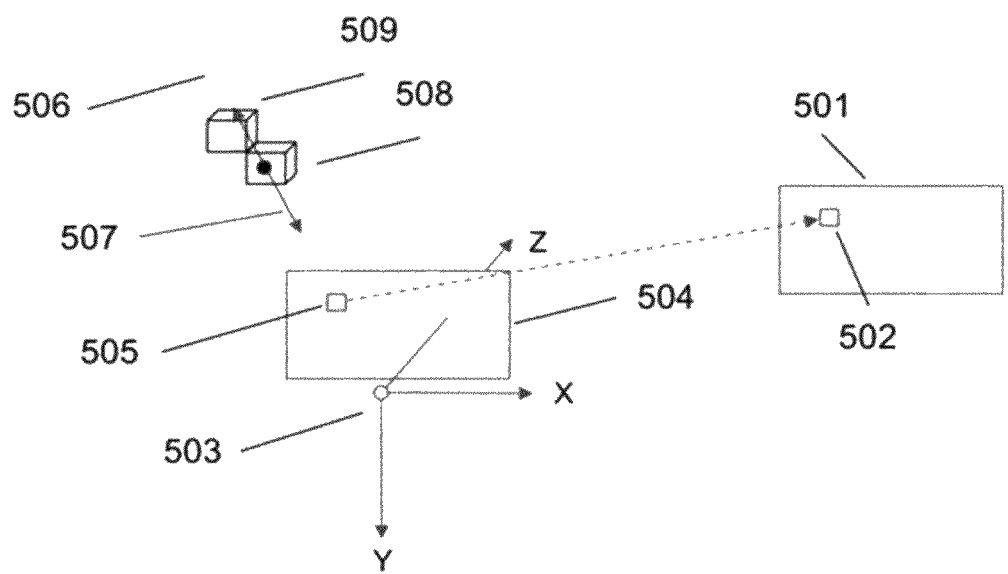
FIG. 5 efficient ray-casting exploiting depth map input.

Such ray-casting requires casting a third ray 506 from the camera center 503 through each pixel location 505 (as shown in FIG. 5). Then, we need to search along the ray in order to find the actual surface of the reconstructed scene. The ray-casting speed is proportionally slow with respect to the scene resolution and the depth map frame resolution.

To overcome the ineffectiveness of ray-casting, we reduce the depth interval of searching along the cast ray. As illustrated in FIG. 5, we use the initial observed depth map frame input where the depth of the associated pixel 502 is known. We search along the third cast ray 506 in the limited second depth interval 507 close to the observed depth. In FIG. 5, the search along second depth interval 507 results in two hits of the third ray 506 on voxels 508 and 509. Finally, the surface point along the ray is interpolated using the Signed Distance Function values of voxels 508, 509 and neighboring voxels if any.

The invention is not limited to the embodiments shown or described. Rather, any and all combinations of the individual features described, as shown in the figures or described in the description, and to the extent that a corresponding combination appears possible and sensible, are subject matters of the invention.

As stated above, the invention relates to a highly efficient indexing method that enables real-time 3D reconstruction performance on a low cost computation unit, low memory usage through surface resolution prediction, an adaptive ray-casting method through exploiting the depth map input and/or a highly parallelized algorithm with separation of "preparation" and "integration" in the 3D volumetric reconstruction.

It is hard to build an efficient depth sensors based 3D reconstruction with affordable cost. The challenge has been actively tackled from various research and industry communities: robotics, augmented reality, and autonomous driving. Our proposed solution leads to efficient memory handling with very low memory usage; the solution is also easily deployed to a CPU only architecture. Our solution makes 3D reconstruction technologies available to a wider range of applications including 3D body scanning, 3D objects scanning, etc.

LIST OF REFERENCE CHARACTERS

101: depth map input from depth sensors
102: 3D volumetric scene representation of the reconstructed scene
103: camera pose estimation is to localize the current depth sensors camera with respect to common coordinates
104: ray-casting is to generate a depth map through casting rays from a given camera position
105: preparation through collecting necessary voxels in the reconstructed scene in order to do update with new coming depth map
106: integrating new depth values into the reconstructed scene
201: an array of voxel blocks represented as continuous memory, each block consists of 8×8×8 voxels
202: an array of index values; each index value maps a discretized 3D position to an element of the vector in 201
203: an element of array 202, which contains an index to an element of array 201, and the order of this element corresponds to a unique discretized 3D position
204: the arrows indicate the mapping relation between element 203 of array 202 to a non-conflicting element 205 of array 201
301: 3D coordinate system of depth sensors camera
302: camera plane where z is equal to 1
303: a first ray cast from the camera center through an associated 3D position of a pixel on the camera plane 302
304: 3D position in the camera coordinates given the observed depth value of the associated pixel
305: the arrow illustrates the first depth interval of the associated pixel, in which we search for potential voxels (either existing or non-existing)
306: illustrates an existing voxel in the reconstructed scene, where the first cast ray 303 hits
307: illustrates a non-existing voxel in the reconstructed scene, where the first cast ray 303 hits
401: 3D camera coordinate system of depth sensors camera

402: 3D camera plane at z is equal to 1
403: depth map image represented as 2D array of pixels associated with depth values
404: a second ray cast from the camera center through the associated origin 3D position of voxel 406
405: 3D position of voxel 406's origin
406: a reconstructed voxel of the scene
407: re-reprojected location of the voxel origin on the camera plane 402
408: the pixel associates with the reprojected location 407
501: depth map image represented as 2D array of pixels with associated depth values
502: a 2D pixel
503: 3D camera coordinate system of depth sensors camera
504: 3D camera plane where z is equal to 1
505: 3D location of the associated pixel 502 on the camera plane 504
506: a third ray cast from the camera center through the 3D pixel location on the camera plane
507: the arrow represents the second depth interval of the observed depth value of the associated pixel 502
508: a reconstructed voxel which the third ray 506 hits
509: another reconstructed voxel which the third ray 506 hits

The invention claimed is:

1. A method for real-time volumetric 3D reconstruction of an object using at least one depth sensor camera, the method comprising:
   performing a preparation step of a new depth map frame, wherein the preparation step includes generating a first cast ray that extends from a camera center through an associated 3D position of an associated pixel on a camera plane, wherein the preparation step includes determining a first depth interval on the first cast ray, wherein the first depth interval is determined on the first cast ray depending on the new depth map frame and depending on a depth value of the associated pixel;
   wherein the preparation step includes a search step in which are searched only an existing voxel and a non-existing voxel that is adjacent the existing voxel, which are hit by the first cast ray in the first depth interval;
   wherein in the preparation step multiple search steps are parallelized as a a plurality of individual search threads and each individual search thread does searching on a separate pixel;
   wherein in the preparation step only the existing voxels and the non-existing voxels are collected in a reconstructed scene depending on the new depth map frame and in which the collected existing voxels and the non-existing voxels are cached in order to perform an update of the reconstructed scene; and
   performing an integration step, in which only the collected and cached voxels and non-existing voxels of the preparation step are updated with a newly captured depth map frame;
   wherein the preparation step and the integration step are separated from each other so that both the preparation and integration steps can be carried out in parallel at the same time.

2. Method according to claim 1, wherein in the preparation step the existing voxel and the non-existing voxel are searched on each pixel by checking the respective first depth interval along the first cast ray.

3. Method according to claim 1, wherein as a result of the preparation step a list of existing voxels and non-existing voxels, which are close to the observed depth map, is prepared.

4. Method according to claim 3, wherein the integration step concurrently processes a list of existing and non-existing voxels.

5. Method according to claim 1, wherein in the integration step the update starts by re-projecting a voxel origin position of a reconstructed voxel of the reconstructed scene to the camera plane.

6. Method according to claim 1, wherein a second cast ray is generated for re-projecting a voxel origin position of the reconstructed voxel to the camera plane, wherein the second cast ray extends from the camera center through the associated voxel origin position of the reconstructed voxel.

7. Method according to claim 1, further comprising the steps of: determining a re-projected location of a voxel origin on the camera plane, then determining an associated depth value of an associated pixel of the depth map frame, and using the determined depth value to update a Signed Distance Function of the corresponding voxel.

8. Method according to claim 1, wherein the integration step is parallelized such that each thread updates separate reconstructed voxels of the reconstructed scene.

9. Method according to claim 1, wherein an indexing mechanism is used in which a mapping array is predefined, wherein the mapping array maps the 3D voxel origin position of at least one reconstructed voxel of the scene to a pre-allocated array of voxel blocks and
   wherein on the basis of experience values that have been experimentally derived, a number of reconstructed surface voxels is predicted and an array of reconstructed voxel blocks is pre-allocated with this number.

10. Method according to claim 1, wherein for parallelizing the preparation step and the integration step, the non-existing voxels are successively updated to an array of the reconstructed voxel blocks.

11. Method according to claim 1, further comprising: a ray-casting step, in which the depth map input is exploited, wherein a second depth interval is determined on a third cast ray by using an initial observed depth map frame where the depth value of the associated pixel is known, wherein voxels are searched along the second depth interval, which are hit by the third cast ray, and wherein a surface point along the third cast ray is interpolated using a Signed Distance Function values of the founded and neighboring voxels.

12. 3D body scanner for real-time volumetric 3D reconstruction of an object, the 3D body scanner comprising:
   at least one depth sensor; and
   a processor, which is designed to operate with a method as set forth in claim 1 and is connected to the at least one depth sensor.

* * * * *